(12) United States Patent
Jaehnicke

(10) Patent No.: US 11,141,898 B2
(45) Date of Patent: Oct. 12, 2021

(54) METHOD AND DEVICE FOR APPLYING AT LEAST ONE MATERIAL, EXTRUDER, 3D PRINT HEAD, 3D PRINTER, MACHINE TOOL AND CONTROL DEVICE

(71) Applicant: Siemens Aktiengesellschaft, Munich (DE)

(72) Inventor: Jens Jaehnicke, Chemnitz (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/737,573

(22) PCT Filed: May 19, 2016

(86) PCT No.: PCT/EP2016/061197
§ 371 (c)(1),
(2) Date: Dec. 18, 2017

(87) PCT Pub. No.: WO2016/202518
PCT Pub. Date: Dec. 22, 2016

(65) Prior Publication Data
US 2018/0186071 A1 Jul. 5, 2018

(30) Foreign Application Priority Data
Jun. 18, 2015 (EP) .................................... 15172648

(51) Int. Cl.
*B29C 48/05* (2019.01)
*B29C 48/17* (2019.01)
(Continued)

(52) U.S. Cl.
CPC ............ *B29C 48/05* (2019.02); *B29C 48/155* (2019.02); *B29C 48/17* (2019.02); *B29C 48/266* (2019.02);
(Continued)

(58) Field of Classification Search
CPC ..... B29C 64/209; B29C 48/05; B29C 48/266; B29C 48/17; B29C 48/155; B29C 64/118; B29C 64/106; B33Y 30/00; B33Y 10/00
See application file for complete search history.

(56) References Cited

U.S. PATENT DOCUMENTS 2,174,779 A 10/1939 Delorme
5,121,329 A * 6/1992 Crump ................... B22F 3/115
228/180.5
(Continued)

FOREIGN PATENT DOCUMENTS

CN 102582057 7/2012
CN 103158259 6/2013
(Continued)

OTHER PUBLICATIONS

Office Action dated Apr. 27, 2018 which issued in the corresponding Chinese Patent Application No. 201680035167.9.
(Continued)

*Primary Examiner* — Michael M. Robinson
(74) *Attorney, Agent, or Firm* — Cozen O'Connor

(57) ABSTRACT

A control device, method and device for applying at least one material to a substrate or a workpiece, an extruder, a 3D print head, a 3D printer and a machine tool, wherein the device includes a main body with an outlet for the materials, where the materials are fed through at least two access channels to the outlet and mixed and/or blended at this location, where a rotational movement of the main body with respect to the substrate or the workpiece causes the materials to blend in a manner analogous to a double helix or a plait such that mixing/blending of the materials is advantageously improved, and where if applied to a 3D printing process, then either the workpiece rotates about an axis of rotation that extends through the outlet of the main
(Continued)

body, or the main body and consequently the outlet itself rotates.

14 Claims, 3 Drawing Sheets

(51) Int. Cl.
    *B29C 48/155*     (2019.01)
    *B29C 48/25*     (2019.01)
    *B33Y 10/00*     (2015.01)
    *B33Y 30/00*     (2015.01)
    *B29C 64/118*     (2017.01)
    *B29C 64/209*     (2017.01)

(52) U.S. Cl.
    CPC .......... *B29C 64/118* (2017.08); *B29C 64/209* (2017.08); *B33Y 10/00* (2014.12); *B33Y 30/00* (2014.12)

(56) References Cited

U.S. PATENT DOCUMENTS

| | | | |
|---|---|---|---|
| 6,214,279 B1 * | 4/2001 | Yang | B29C 41/52 264/308 |
| 6,405,095 B1 * | 6/2002 | Jang | G05B 19/4099 264/308 |
| 6,749,414 B1 | 6/2004 | Hanson et al. | |
| 2008/0102558 A1 * | 5/2008 | Fork | H01M 14/005 438/98 |
| 2013/0209600 A1 | 8/2013 | Tow | |
| 2014/0079841 A1 | 3/2014 | Pridoehl et al. | |
| 2014/0183792 A1 | 7/2014 | Leu et al. | |
| 2014/0232035 A1 * | 8/2014 | Bheda | B29C 64/106 264/148 |
| 2014/0277661 A1 | 9/2014 | Amadio et al. | |
| 2015/0183161 A1 * | 7/2015 | Molinari | B29C 67/0085 425/375 |
| 2015/0202646 A1 * | 7/2015 | Fischer | B05C 5/0241 427/434.6 |
| 2015/0298393 A1 * | 10/2015 | Suarez | B33Y 70/00 425/3 |
| 2016/0136897 A1 * | 5/2016 | Nielsen-Cole | B33Y 30/00 425/131.1 |

FOREIGN PATENT DOCUMENTS

| | | |
|---|---|---|
| CN | 103448247 | 12/2013 |
| CN | 103770334 | 5/2014 |
| CN | 103895228 | 7/2014 |
| CN | 103909655 | 7/2014 |
| CN | 203945691 U | 11/2014 |
| CN | 104224405 | 12/2014 |
| CN | 204020007 | 12/2014 |
| CN | 104309123 | 1/2015 |
| CN | 104441666 | 3/2015 |
| CN | 104494152 | 4/2015 |
| CN | 104552932 | 4/2015 |
| DE | 102011075544 | 11/2012 |

OTHER PUBLICATIONS

Office Action dated Oct. 16, 2018 issued in Chinese Patent Application No. 201680035167.9.

PCT International Search Report and Written Opinion of International Searching Authority dated Aug. 23, 2016 corresponding to PCT International Application No. PCT/EP2016/061197 filed May 19, 2016.

\* cited by examiner

METHOD AND DEVICE FOR APPLYING AT LEAST ONE MATERIAL, EXTRUDER, 3D PRINT HEAD, 3D PRINTER, MACHINE TOOL AND CONTROL DEVICE

CROSS-REFERENCE TO RELATED APPLICATIONS

This is a U.S. national stage of application No. PCT/EP2016/061197 filed 19 May 2016 and claims the priority of European application no. 15172648 filed Jun. 18, 2015, the content of which is incorporated herein by reference in its entirety.

BACKGROUND OF THE INVENTION

1. Field of the Invention

The invention relates to a control device, a method, a device for depositing at least one material onto a substrate or a workpiece, an extruder, a 3D print head, a 3D printer and a machine tool.

2. Description of the Related Art

Currently, the creation of three-dimensional shapes based on shape specifications that are stored in a computer program or in a file is often accomplished via 3D printers. One possible way to accomplish 3D printing with the aid of a 3D printer is the fused deposition modeling (FDM) process, where a material, in particular a plastic or a resin, is melted. Here, the molten material is deposited on a substrate along a preselected path via a nozzle (outlet). The substrate is either the unfinished workpiece or a surface upon which the workpiece is to be produced. Until now, however, the printing of multicolored workpieces or workpieces composed of different materials has only been possible subject to limitations.

A possible approach to a solution is disclosed in CN 103770334 A. The 3D printer described there permits different materials or materials in a variety of colors to be fed to a 3D printing process, where the different materials are combined in a 3D print head and are subsequently deposited onto the workpiece.

A print head is described in DE 10 2011 075 544 A1, where a polymer strand intended for the production of an object is colored in the nozzle by addition of coloring agents.

A disadvantageous aspect with the prior art is the lack of a way to efficiently produce workpieces having continuous color transitions.

SUMMARY OF THE INVENTION

In view of the foregoing, it is therefore an object of the invention to improve the production of workpieces composed of a plurality of materials and/or colors.

This and other objects and advantages are achieved in accordance with the invention by a device, a method, a control device, an extruder, a 3D print head, a 3D printer, and a machine tool or production machine, by which a workpiece is produced with the aid of the device, where upon completion the workpiece consists of a first material and a second material, and possibly of further materials. In this case, the device advantageously serves to mix at least the first material with the second material such that a defined mixing ratio between the first material and the second material is present at every point in space of the workpiece.

In order to achieve the mixing and/or blending, the first material is delivered to the outlet through the first access channel, and the second material through the second access channel such that, when the main body is rotated about the axis of rotation, the materials are swirled together, blended and/or mixed in their liquid state. As a result of this swirling or mixing or blending of the materials, the materials can be present in a preselected mixing ratio at every point in space of the workpiece. The mixing ratio of the materials is preferably determined through control or regulation of the volumetric flow rate of the respective materials. The volumetric flow rate is controlled or regulated via advancing elements, for example.

The assignment channels serve to transport the material (which is possibly present in sections in a fluid state) through the main body to the outlet.

The rotation of the main body and/or a sub-body or the workpiece, in particular about an axis of rotation that extends through the outlet, serves to mix or blend the materials with one another.

An inside face of an outlet is understood to mean for example, the inwardly pointing lateral surface of the outlet of the main body. The inside face of the outlet is in contact with the materials that pass through the outlet. Accordingly, a rotating outlet leads to a thorough mixing and/or blending of the materials through friction between the inside face of the outlet and the materials when the materials are deposited onto the substrate and/or onto the workpiece.

Rotating the main body, the extruder or the entire 3D print head with respect to the workpiece or with respect to the substrate is, in most cases, easier than rotating the workpiece while the main body/sub-body or extruder remains stationary.

Instead of the main body being rotated about an axis of rotation while the material remains stationary, it is also possible to rotate the workpiece about an axis of rotation while the main body is kept stationary.

A combination of a rotational movement of the workpiece and the translational movement of the main body or the extruder enables the control of the movement to be managed in a particularly simple manner. The outlet (outlet orifice) is the opening in the main body through which the materials are discharged from the access channels and deposited onto the substrate or workpiece. Viewed from the outside of the main body, the outlet is an opening. The opening or outlet forms the end of the access channels.

A combined rotational movement of the workpiece with respect to the substrate is likewise possible, where both the workpiece or substrate and the main body rotate. In this case, a rotation is also performed about an axis of rotation that extends through the outlet of the main body. The axis of rotation does not necessarily pass through an axis of inertia/axis of symmetry of the workpiece. Here, the speed of rotation of the main body or workpiece dictates the degree of blending or mixing of the materials with one another.

Advantageously, the access channels converge only at a point immediately before the outlet orifice, such that a mixing in the outlet itself affects only a small proportion of the first material and the at least one second material. During a slow rotation of the main body and/or workpiece or substrate, the materials are therefore blended such that a braid-shaped structure consisting of the first material and the second material is discharged from the outlet. In other words, the blending/mixing of the materials occurs substantially outside of the main body or extruder. For metals or plastics as materials, the outlet may also be a cylinder-shaped opening with a height of 0.5 mm to 3 mm, the access channels leading into the outlet at the upper covering surface and the lower covering surface of the outlet being the opening of the main body, i.e., the outlet.

Suitable materials advantageously include plastics, in particular thermoplastics, resins and/or metal or metallic alloys.

With the device, it is possible for materials to be mixed only at the finished workpiece, such that a demixing due to different physical properties of the materials, which would occur in a macroscopic mixing ratio, is prevented. In the device described here, the materials pass through the access channels at least in sections in a liquid/molten form. After being discharged from the outlet of the main body, the materials solidify or cool down to form a solid mixture of the materials. This solidification can happen either due to curing or hardening, often caused by a cooling down of the materials, or as a result of a chemical reaction. In the case of plastics, a cooling process occurs, leading to an increase in solidity. An example of a chemical reaction for the curing or hardening process would be an epoxy resin with the corresponding hardening agent.

The device is particularly well suited to the production of multicolored workpieces composed of one material having a first color and a second material having a second color. In this case, the materials having the different colors, in particular primary colors, can be mixed in any mixing ratio and thus a workpiece can be provided having any conceivable patterning or color scheme.

The execution of the method is controlled and/or monitored with the aid of the control device. The control device advantageously serves to control the translational movement of the extruder or main body and/or the material or substrate. The control device advantageously serves also to control the at least one heating element. In order to adjust the composition of the materials and/or the color of the workpiece, the control device also serves to control the advancing elements. The control device can be part of the overall controller of a machine tool. The control device may also be part of a software component that supplements the control of a machine tool, a 3D printer or a production machine.

In an advantageous embodiment of the device, the main body is fixedly connected, in particular in its entirety, to the outlet, in particular to the inside face thereof. The fixed connection is understood in the present context in particular to mean a rotatably fixed connection. In this embodiment, the entire main body rotates about the axis of rotation. Further elements, such as at least one heating element, an advancing element for conveying a first material and at least one further advancing element for conveying a further material can be associated with the rotating main body. The rotation of the main body and consequently of the inside face of the outlet results in the materials being mixed or blended due to the speed of rotation of the main body.

During the rotation of the outlet, a kind of braid is produced from the materials. In this process, the speed of rotation and/or the supply rate of at least one material define the degree to which the first material is mixed with the second material as well as optionally with the further materials.

In a further advantageous embodiment, the main body has a sub-body, where the sub-body is rotatable with respect to the main body, where the access channels extend through the sub-body, where a feed system for the first material is provided to supply the first access channel, and where a further feed system for the second material is provided to supply the second access channel.

Advantageously, both the main body and the sub-body have access channels. The transition between the access channels of the main body and the sub-body is realized via the feed system. If the main body and/or the sub-body have three or more access channels, each access channel of the sub-body will advantageously have a separate feed system. A first feed system is advantageously associated with the first access channel, and a second feed system is associated with the second access channel.

The access channels of the sub-body serve to transport the material from the respective feed system to the outlet of the main body. The sub-body forms part of the main body or is associated with the main body.

The feed system advantageously serves to transfer the material from the access channel of the main body into the access channel of the sub-body.

In the presently contemplated embodiment, only the sub-body rotates with respect to the main body (which is arranged in a rotationally fixed manner) as well as with respect to the workpiece or substrate. The sub-body, which is associated with the main body, can be set into rotational movement by a motor or a belt drive. Here, the feed device or the at least one further feed device in this case supplies the first access channel of the sub-body with the first material and the second access channel of the sub-body with the second material. A particularly advantageous aspect with regard to this embodiment is that only the sub-body rotates, i.e., the workpiece or substrate and the main body itself do not rotate. This removes the need for costly, time-consuming and complicated methods of controlling the movement of the main body or workpiece/substrate, as well as for complex structural measures. In the present embodiment, the sub-body rather than the main body has the outlet.

In a further advantageous embodiment, a motor is provided for rotating the main body or the sub-body.

If a sub-body is associated with the main body and the sub-body rotates with respect to the main body, the motor is advantageously mounted on the main body. If provision is made for the workpiece or the substrate to rotate, the rotation of the workpiece or substrate is advantageously effected via a drive system that does not belong to the claimed device but, for example, defines the position of the workpiece or substrate in a machine tool. In a simplified arrangement, however, the substrate or the tool can also be rotated about the axis of rotation by a motor, in which case the axis of rotation passes through the outlet of the main body or sub-body.

In a further advantageous embodiment, the main body and/or the sub-body have/has at least one heating element. In the device, the heating element advantageously serves to heat the materials. Heating the material causes the material to melt and allows it to be deposited onto the substrate or workpiece with the aid of the device or the extruder. Particularly advantageously, a heating element is arranged in the lower region of the main body so that mixing or blending of the materials in the region of the outlet is not prevented or detrimentally affected by a premature solidification of the materials.

In an advantageous embodiment of the method, the rotating outlet leads to the mixing or blending of the materials, in particular of the first material with the second material. Blending or mixing of the first and second material is realized by friction between the materials, in particular in their liquid form, via the rim or the inside face of the outlet. This process results in a swirled pattern resembling a braid composed of the first and second material.

A rough surface on the inside face of the outlet can promote blending or mixing of the materials. An improved mixing or blending of the first with the at least one second material is possible via this advantageous embodiment. Here, the shape of the outlet or outlet orifice can be configured as angular, in particular rectangular or triangular, or round at least in sections.

In an advantageous embodiment of the method, the rotating outlet leads to mixing and/or blending of the first material and the at least one second material. In order to rotate the outlet, it is advantageous to configure the main body, the extruder or at least the sub-body as rotatable. The rotation is then advantageously effected with the aid of the motor. The speed of rotation can be controlled via the control device. The speed of rotation as a function of the translational movement of the main body, the sub-body and/or the extruder determines the degree of blending through the tightness of the resulting "braid" composed of the materials. Advantageously, the degree of blending can be regulated via rotation of the outlet with respect to the substrate or workpiece.

In a further embodiment of the method, the first material is conducted through the first access channel via an advancing element and the at least one second material is conducted through an at least one second access channel via at least one second advancing element.

The proportion of the first material with respect to the at least one second material can be controlled via the advancing elements, which are advantageously controlled by the control device. Thus, the material or the color of the workpiece can be set precisely at any point.

In a further advantageous embodiment of the method, a first material in a first primary color is conducted to the outlet by means of a first access channel, where a second material in a second primary color is conducted to the outlet via a second access channel, and where a third material having a third primary color is conducted to the outlet via a third access channel.

A material of any color or color density can be produced via the three primary colors, such as yellow, blue and red, or yellow, blue and green. This advantageously enables workpieces of any color and/or pattern to be produced. It is furthermore possible to produce a workpiece having an individual composition of materials.

The field of application of the disclosed embodiments of the invention concerns a machine tool which, in addition to a workpiece machining capability, also possesses an additive fabrication unit, as well as a 3D printer, a 3D print head and a production machine, where the production machine can employ additive fabrication steps to enhance the quality of the goods produced in it.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described and explained in more detail below with reference to figures, in which.

DETAILED DESCRIPTION OF THE EXEMPLARY EMBODIMENTS

Figure 1:
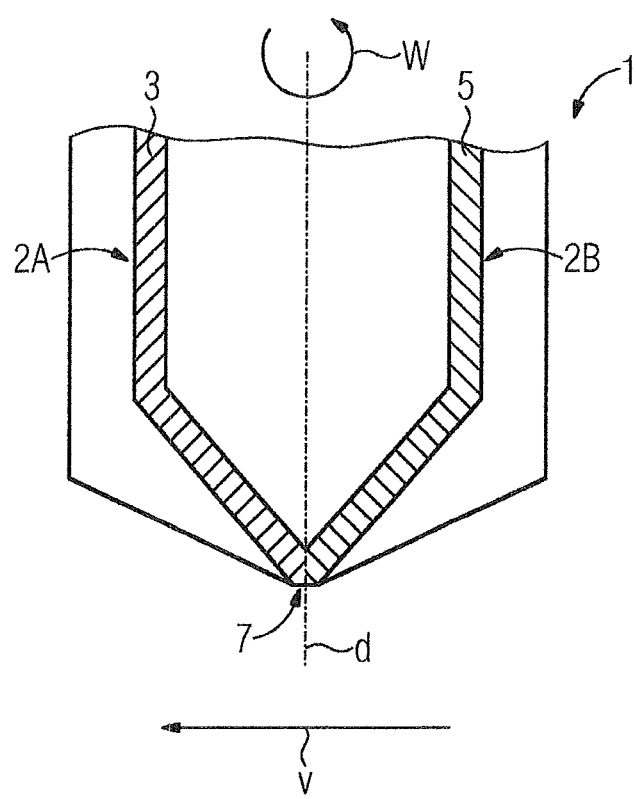
FIG. 1 shows a schematic layout of a main body in accordance with the invention.

FIG. 1 shows the schematic layout of a main body 1. The main body 1 is advantageously a part of a 3D print head, where the main body 1 consists of a piece of metal, where the main body 1 has a first access channel 2A and a second access channel 2B, and where the access channels 2A, 2B are filled from above with a first material 3 and a second material 5, respectively. The materials 3, 5 are discharged from an outlet 7 of the main body 1. The main body 1 is mounted so as to be rotatable about an axis of rotation d. The axis of rotation d extends through the outlet 7, with the outlet 7 being arranged on the underside of the main body 1. Both the first access channel 2A and the second access channel 2B terminate directly at the outlet 7 of the main body. The outlet 7 of the main body 1 is a downward-directed opening in the main body 1, where the access channels 2A, 2B ends in the outlet 7. In the method described here, the main body 1 rotates about the axis of rotation d at a speed of rotation W. During the production of the workpiece WS, the main body 1 additionally executes a translational movement in the movement direction V. The translational movement is performed with respect to the workpiece WS and/or to the base area. The translational movement is indicated by an arrow below the main body 1.

Figure 2:
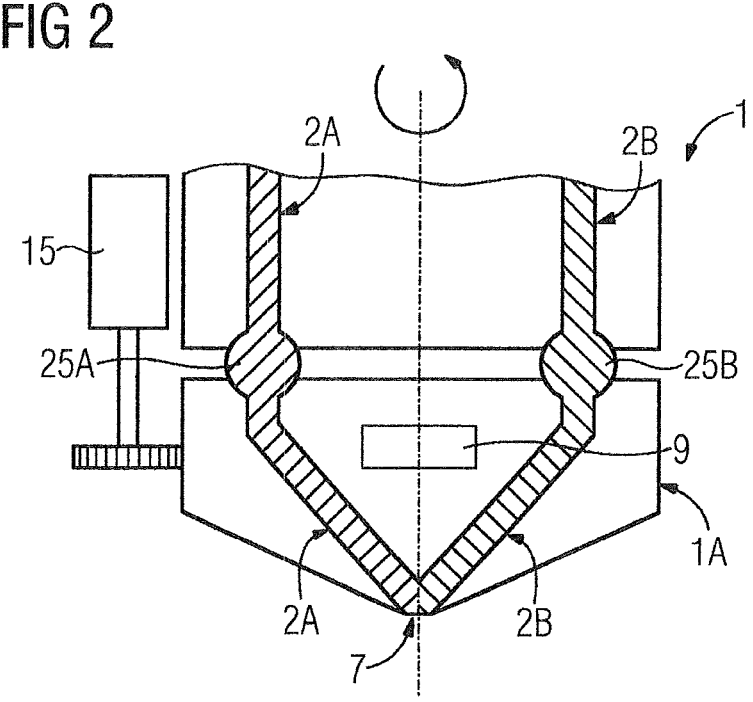
FIG. 2 shows a main body with a sub-body in accordance with the invention.

FIG. 2 shows a main body 1 with a sub-body 1A. In this configuration, the sub-body 1A is rotatably connected to the main body 1, where the sub-body 1A is mounted so as to be rotatable about an axis of rotation d. The sub-body 1A is set into an rotational movement with the aid of a motor 15, where the rotation of the sub-body 1A is performed with respect to the main body 1 and/or with respect to the workpiece or to the substrate. The main body 1 has a first access channel 2A and a second access channel 2B, with the first access channel 2A leading into a first feed system 25A and the second access channel 2B leading into a second feed system 25B. The first feed system 25A and the second feed system 25B serve as a bridging means for the materials 3, 5 between the main body 1 and the sub-body 1A, such that a first material 3 can be transferred into the first access channel 2A of the sub-body 1A with the aid of the first access channel 2A to the first feed system 25A. Furthermore, the second material 5 is supplied via a second access channel 2B of the main body 1, then by the second feed system 25B into the second access channel 2B of the sub-body 1A, with the first and the second access channel 2A, 2B of the sub-body 1A leading into the outlet 7 of the sub-body 1A. Further heating elements 9 may also be associated with the main body 1.

Contrary to the layout illustrated in FIG. 2, no macroscopic gap is present between the main body 1 and the sub-body 1A. Rather, the surface of the sub-body 1A is in abutment with the opposite surface of the main body 1. An intermediate layer (not shown) is also possible between the lower surface of the main body 1 and the upper surface of the sub-body 1A, which intermediate layer does not extend continuously in the region of the feed systems 25A, 25B. The feed systems 25A, 25B can be sealed off by the intermediate layer. Friction can be reduced in addition. The intermediate layer can also be realized via a coating on the sub-body 1A and/or the main body 1. Here, the sub-body 1A additionally has a heating element 9 so that a first material 3 and a second material 5 do not solidify or harden in an access channel 2A, 2B of the sub-body 1A. The embodiment shown in FIG. 2 possesses the advantage that only the sub-body 1A rotates in relation to the main body 1 or the workpiece WS, thus removing the need for a complicated rotation of the workpiece WS or the substrate and/or a rotation of the main body 1.

Figure 3:
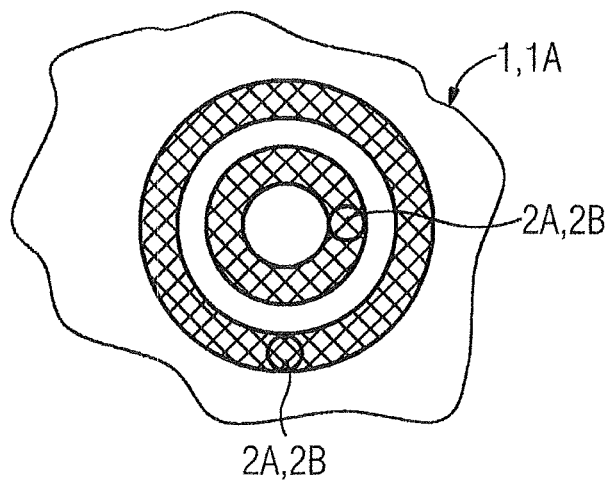
FIG. 3 shows a further view of the main body or sub-body; in accordance with the invention.

FIG. 3 shows a further view of the main body 1 or the sub-body 1A. The intermediate section between the main body 1 and the sub-body 1A is shown, where the main body 1 and the sub-body 2 have the recesses designated by hatching on the side at which the two are joined together. The surfaces in abutment with one another in the print head each have two torus-section-shaped recesses that are provided for transferring the first material 3 or the second material 5. The two torus-section-shaped recesses of the main body or the sub-body 1A have openings, where the openings represent the access points to the access channels 2A, 2B. When the main body 1 and the sub-body 1A are joined together, a torus-shaped recess therefore results. The torus-shaped recess is bounded on one side by the sub-body 1A. The torus-shaped recess is bounded on the other side by the main body 1. On the side of the sub-body 1, the torus-section-shaped recesses have an outlet to the respective access channel 2A, 2B as well as an inlet on the side of the main body. The inlet is connected in each case to the access channel 2A, 2B of the main body 1. The connection of the access channels 2A, 2B on the side of the main body 1 to the respective access channels 2A, 2B of the sub-body via the respective feed system 25A, 25B serves to transfer the materials 3, 5 from the access channel 2A, 2B of the main body 1 to the corresponding access channels 2A, 2B of the sub-body.

In this arrangement, the axis of rotation d stands vertically, roughly in the middle of the surfaces shown. When a rotation of the sub-body 1 with respect to the main body 1A is performed, the shape of the torus-shaped recesses is preserved.

The torus-shaped recess with the two openings (inlet orifice and an outlet orifice) that end in the access channels 2A, 2B form the feed system 25A, 25B. A main body 1 with associated sub-body 1A has such a feed system 25A, 25B for each material 3, 5 that is to be processed.

The torus-shaped recesses are filled with a material 3, 5 through the respective inbound access channel 2A, 2B (of the main body 1). The material 3, 5 exits the torus-shaped recess through the access channel 2A, 2B of the sub-body 1A.

Figure 4:
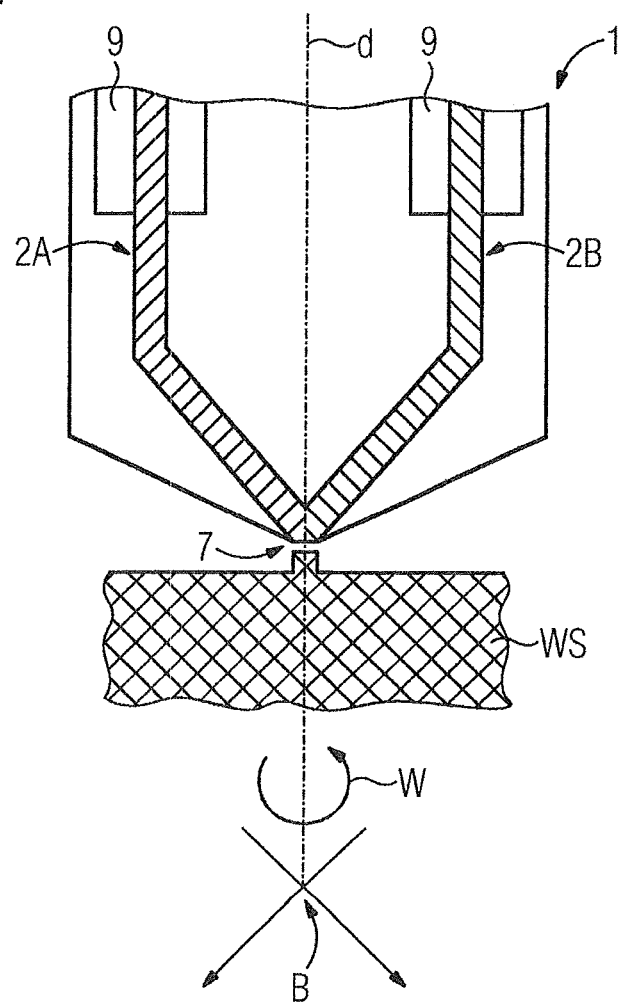
FIG. 4 shows a schematic illustration of the method for producing a workpiece in accordance with the invention.

FIG. 4 shows the schematic illustration of a method for producing a workpiece WS. The main body 1 is shown together with the first access channel 2A and the second access channel 2B, where a heating element 9 is associated with each of the first and the second access channel 2A, 2B. The first material 3 is deposited onto the workpiece WS via the first access channel 2A through the outlet 7 and the second material 5 is deposited onto the workpiece WS via the second access channel 2B through the outlet 7. The materials may also be deposited onto a substrate. Instead of the main body 1 or the sub-body 1A, in this case the workpiece WS or the substrate rotates about an axis of rotation d at a speed of rotation W. In addition, the workpiece WS and/or the substrate move such that the workpiece WS and/or the substrate rotate continuously about the axis of rotation d, with the axis of rotation d extending through the outlet 7. This is symbolized by the crossed arrows B under the workpiece WS. In the presently shown embodiment, the main body 1 or the sub-body 1A remains constant in its orientation. The main body 1A changes its position with respect to the workpiece WS or with respect to the substrate only in a translational movement.

The (translational) movement of the workpiece WS, the main body 1, the speed of rotation v of the main body 1, the sub-body 1A, and the movement of the workpiece WS/substrate in the embodiment shown in FIG. 4 are controlled or regulated by the control device based on the specifications for the workpiece. The control device can furthermore control the heating elements 9, the motor 15 and, where applicable, further elements. The translational movement of the workpiece is symbolized by the crossed arrows B underneath the workpiece WS.

Although the present exemplary embodiments shown are each depicted with two access channels 2A, 2B and two, in particular different, materials 3, 5, the invention is also suitable for application with in each case three, four or more access channels for three, four or more materials.

The disclosed embodiments of the invention can be used particularly advantageously for providing a material composed of a metallic alloy. The metals, in particular metals having a low melting point, can be blended via the device or method described here to form an alloy and the alloy can serve as material for a workpiece. Thus, metals having different densities, such as aluminum and lead, may also be utilized as material for producing a workpiece.

In sum, the disclosed embodiments of the invention relate to a method and a device for depositing at least one material 3, 5 onto a substrate or a workpiece WS, an extruder, a 3D print head, a 3D printer and a machine tool. The disclosed embodiments of invention also relate to a control device. The device has a main body 1 having an outlet 7 for the materials 3, 5. The materials 3, 5 are supplied to the outlet 7 through at least two access channels 2A, 2B and are mixed and/or blended there. A rotational movement of the main body 1 with respect to the substrate or the workpiece WS causes the materials 3, 5 to be blended in a manner analogous to a double helix or a braid. Blending/mixing of the materials is advantageously improved via the invention. When applied to a 3D printing method, either the workpiece WS rotates about an axis of rotation d that extends through the outlet 7 of the main body 1, or the main body 1, and consequently the outlet 7 itself, rotates.

Figure 5:
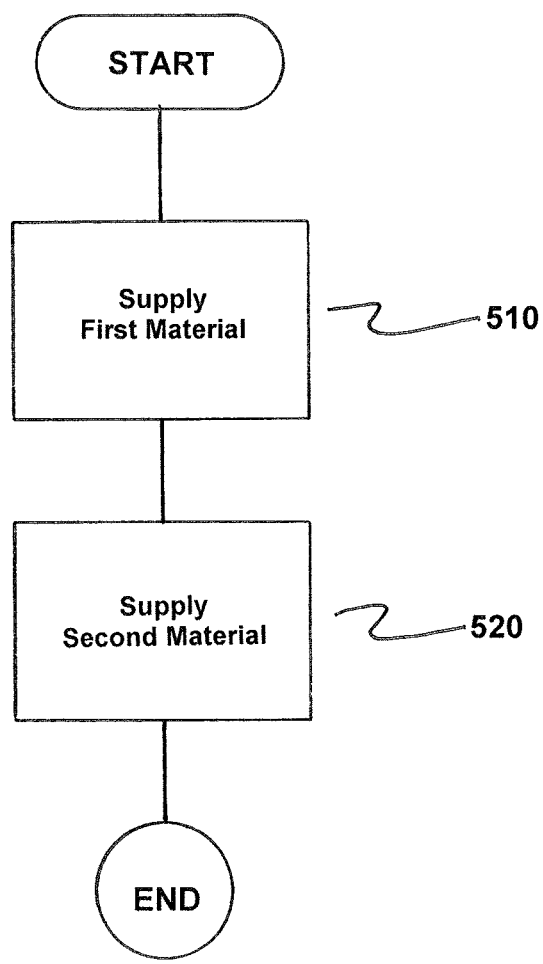
FIG. 5 is a flowchart of the method in accordance with the invention.

FIG. 5 is a flowchart of the fused deposition modelling method for depositing at least one material 3, 5 onto a substrate or a workpiece WS. The method comprises supplying at least a first material 3 to an outlet 7 of a main body 1 through a first access channel 2A, as indicated in step 510.

Next, a second material 5 is supplied to the outlet 7 of the main body 1 through a second access channel 2B, as indicated in step 520.

In accordance with the invention, at least one of (i) the main body and (ii) the workpiece and the substrate rotate about an axis of rotation d that extends through the outlet 7, where the outlet (7) forms converged ends of the first and second access channels (2A, 2B).

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device for depositing at least one material onto a substrate or a workpiece via a fused deposition modeling method, the device comprising:
a main body including at least a first access channel, a second access channel and an external outlet, the first access channel receiving a first material and the second access channel receiving a second material, the first and second access channels extending at one part parallel to and spaced apart from a central axis of the main body and extending at another part at an angle to the central axis of the main body to end in the outlet of the main body;
a feed system for the first material to supply the first access channel; and
a further feed system for the second material to supply the second access channel;
wherein an inside face of at least one of (i) the outlet, (ii) the workpiece and (iii) the substrate is rotatable about an axis of rotation which extends through the outlet;
wherein a combination of the first material and the second material is provided upon the at least first material and second material being discharged through the outlet;
wherein the first and second access channels converge and merge together and form the external outlet of the device;
wherein the main body has a sub-body which is rotatable with respect to the main body; and
wherein the first and second access channels extend through the sub-body.

2. The device as claimed in claim 1, further comprising: a motor for rotating the main body or the sub-body.

3. The device as claimed in claim 1, wherein at least one of (i) the main body and (ii) the sub-body include at least one heating element.

4. An extruder having the device for depositing the at least one material onto the substrate or the workpiece as claimed in claim 1.

5. A 3D print head having the device as claimed in claim 1.

6. A 3D printer having the device as claimed in claim 1, wherein at least one of the device and the workpiece are rotatable about the axis of rotation.

7. A machine tool or production machine having the device for depositing the at least one material onto the substrate or the workpiece as claimed in claim 1.

8. A fused deposition modeling method for depositing at least one material onto a substrate or a workpiece, comprising:
supplying at least a first material to an external outlet of a main body through a first access channel via a feed system;
supplying a second material to the outlet of the main body through a second access channel via a further feed system, the first and second access channels extending at one part parallel to and spaced apart from a central axis of the main body and extending at another part at an angle to the main body to end in the outlet of the main body;
wherein an inside face of at least one of (i) the outlet, (ii) the workpiece and (iii) the substrate is rotatable about an axis of rotation which extends through the outlet; and
wherein a combination of the first material and the second material is provided upon the at least first material and second material being discharged through the outlet;
wherein the first and second access channels converge and merge together to form the outlet of the main body;
wherein the main body has a sub-body which is rotatable with respect to the main body; and
wherein the first and second access channels extend through the sub-body.

9. The method as claimed in claim 8, wherein the rotating main body leads to at least one of (i) mixing and (ii) blending of the first and second materials.

10. The method as claimed in claim 8, wherein the first material is conducted through the first access channel via a first advancing element; and
wherein the second material is conducted through a second access channel via a second advancing element.

11. The method as claimed in claim 9, wherein the first material is conducted through the first access channel via a first advancing element; and
wherein the second material is conducted through a second access channel via a second advancing element.

12. The method as claimed in claim 8, wherein a first material of a first primary color is conducted to the outlet via the first access channel;
wherein a second material of a second primary color is conducted to the outlet via the second access channel; and
wherein a third material of a third primary color is conducted to the outlet via a third access channel.

13. The method as claimed in claim 9, wherein a first material of a first primary color is conducted to the outlet via the first access channel;
wherein a second material of a second primary color is conducted to the outlet via the second access channel; and
wherein a third material of a third primary color is conducted to the outlet via a third access channel.

14. The method as claimed in claim 10, wherein a first material of a first primary color is conducted to the outlet via the first access channel;
wherein a second material of a second primary color is conducted to the outlet via the second access channel; and
wherein a third material of a third primary color is conducted to the outlet via a third access channel.

* * * * *